US012609419B2

(12) United States Patent
Shin et al.

(10) Patent No.: US 12,609,419 B2
(45) Date of Patent: Apr. 21, 2026

(54) ELECTRODE ASSEMBLY, MANUFACTURING METHOD THEREOF, AND SECONDARY BATTERY

(71) Applicant: SK On Co., Ltd., Seoul (KR)

(72) Inventors: Jae Sik Shin, Daejeon (KR); Bo Kyung Ko, Daejeon (KR); Seung Hoon Ju, Daejeon (KR)

(73) Assignee: SK On Co., Ltd., Seoul (KR)

( * ) Notice: Subject to any disclaimer, the term of this patent is extended or adjusted under 35 U.S.C. 154(b) by 74 days.

(21) Appl. No.: 18/668,249

(22) Filed: May 20, 2024

(65) Prior Publication Data

US 2024/0405384 A1 Dec. 5, 2024

(30) Foreign Application Priority Data

Jun. 2, 2023 (KR) ........................ 10-2023-0071805

(51) Int. Cl.
*H01M 50/54* (2021.01)
*B23K 26/21* (2014.01)
*H01M 10/04* (2006.01)
*H01M 50/533* (2021.01)
*H01M 50/536* (2021.01)

(52) U.S. Cl.
CPC ............. *H01M 50/54* (2021.01); *B23K 26/21* (2015.10); *H01M 10/04* (2013.01); *H01M 50/533* (2021.01); *H01M 50/536* (2021.01)

(58) Field of Classification Search
CPC .................................................... H01M 50/54
See application file for complete search history.

(56) References Cited

U.S. PATENT DOCUMENTS

2023/0299433 A1* 9/2023 Cho .................... H01M 50/178
429/211
2023/0417706 A1* 12/2023 Choi .................. G01N 27/9006

FOREIGN PATENT DOCUMENTS

KR 10-0627369 B1 9/2006
KR 10-2019-0087871 A 7/2019
KR 10-2020-0102177 A 8/2020
KR 10-2265367 B1 6/2021

* cited by examiner

*Primary Examiner* — Kendra Ly
(74) *Attorney, Agent, or Firm* — IP & T GROUP LLP

(57) ABSTRACT

The present disclosure relates to an electrode assembly in which a plurality of first electrode plates including electrode tabs, a plurality of second electrode plates including electrode tabs, and a separator interposed between each of the first electrode plates and each of the second electrode plates are arranged in a stacked manner. In the electrode assembly, electrode tabs of the same polarity are bend-formed so that the electrode tabs are gathered at the center of the stacking direction of the electrode assembly and protrude outward, and sub-tabs may be bonded on the bend-formed electrode tabs. In addition, the present disclosure may include a manufacturing method of an electrode assembly in which a pair of sub-tabs is respectively bonded on opposite sides of a bundle of electrode tabs that are gathered at the center of the stacking direction of the electrode assembly and protrude outward as described above.

8 Claims, 8 Drawing Sheets

100

100

ELECTRODE ASSEMBLY, MANUFACTURING METHOD THEREOF, AND SECONDARY BATTERY

CROSS REFERENCE TO RELATED APPLICATION

This patent document claims the priority and benefits of Korean Patent Application No. 10-2023-0071805, filed Jun. 2, 2023, the entire contents of which are incorporated herein by reference for all purposes.

TECHNICAL FIELD

The present disclosure relates to an electrode assembly, a manufacturing method thereof, and a secondary battery including the electrode assembly.

BACKGROUND

In general, a secondary battery is a battery that can be charged and discharged repeatedly, and is applied as a power source with suitable output characteristics and stability for electric vehicles (EV), hybrid electric vehicles (HEV), energy storage systems (ESS), etc.

Secondary batteries are classified into cylindrical, pouch-type, and prismatic batteries depending on the external shape of a casing that houses an electrode assembly. Among such batteries, demand for prismatic batteries that have a rectangular shape and can be stacked with high integration is increasing.

A prismatic battery consists of: an electrode assembly including a positive electrode plate, a negative electrode plate, and a separator inserted between the positive and negative electrode plates; a casing that accommodates an electrode assembly and electrolyte; and a cap plate that seals an opening of the casing and has an external terminal electrically connected to the electrode assembly.

As shown in Patent Document 1, in a conventional secondary battery, electrical connection is made with an external terminal of a cap assembly through a current collector plate installed on each uncoated portion of an electrode assembly. However, the space for bonding of the uncoated portion and the current collector plate between a casing and the electrode assembly is unnecessarily large, which acts as an impediment to improving the volumetric energy density of the secondary battery.

Moreover, deformation such as distortion of an uncoated portion may make it impossible to guarantee a reliable electrical connection with a current collector plate.

DOCUMENT OF RELATED ART (Patent Document 1) Korean Patent No. 10-0627369

SUMMARY

The present disclosure provides an electrode assembly with improved bonding properties of electrode tabs, especially a bonding structure between electrode tabs and sub-tabs.

In addition, the present disclosure provides a manufacturing method in which electrode tabs and sub-tabs may be electrically connected using a welding method such as laser welding.

In an aspect of the present disclosure, there is provided an electrode assembly including: a plurality of first electrode plates including electrode tabs; a plurality of second electrode plates including electrode tabs; and a separator interposed between each of the first electrode plates and each of the second electrode plates, wherein the each of the first electrode plates and the each of the second electrode plates, and the separator may be arranged in a stacked manner, and electrode tabs of the same polarity may be gathered at a center of a stacking direction of the electrode assembly to form an electrode tab bundle that protrudes outward, and a sub-tab may be bonded to the electrode tab bundle.

In the present disclosure, the electrode tab bundle may include: a central electrode tab arranged in an upright position at a central part of the electrode assembly; and a peripheral electrode tab arranged in a bent state at a peripheral part of the electrode assembly.

In the present disclosure, the peripheral electrode tab may be bent horizontally toward the central part with respect to the stacking direction of the electrode assembly.

Preferably, the sub-tab may be bonded to each side of the electrode tab bundle by laser welding.

In the present disclosure, the sub-tab may include: a base portion; and a support portion configured to protrude from an edge of the base portion.

In addition, a free end of the support portion may be arranged at the same level as a free end of the electrode tab bundle.

Optionally, the base portion may be tapered.

In the present disclosure, the electrode tab bundle may be arranged to extend lengthwise in opposite directions from each end of the electrode assembly.

In an aspect of the present disclosure, there is provided a secondary battery including: an electrode assembly; a casing configured to accommodate the electrode assembly and have one side open; and a cap plate configured to seal an opening on the one side of the casing, wherein in the cap plate, a first electrode terminal and a second electrode terminal connected to the electrode assembly may be arranged in the same direction.

In an aspect of the present disclosure, there is provided a secondary battery including: an electrode assembly; a casing configured to accommodate the electrode assembly and have opposing sides open; and first and second cap plates respectively sealing openings on the opposing sides of the casing, wherein in the first cap plate, a first electrode terminal connected to the electrode assembly may be disposed, and in the second cap plate, a second electrode terminal connected to the electrode assembly may be disposed in an opposite direction to the first electrode terminal.

In an aspect of the present disclosure, there is provided a manufacturing method of an electrode assembly. The method may include: preparing an electrode assembly in which a plurality of first electrode plates including electrode tabs, a plurality of second electrode plates including electrode tabs, and a separator interposed between each of the first electrode plates and each of the second electrode plates are arranged in a stacked manner; bend-forming a plurality of electrode tabs of the same polarity protruding from the electrode assembly so as to be gathered at a center of a stacking direction of the electrode assembly and protrude outward; bonding sub-tabs on the bend-formed electrode tabs; and cutting the electrode tabs protruding and extending outward from the sub-tabs.

In the bend-forming a plurality of electrode tabs, the plurality of electrode tabs may be formed by bending peripheral electrode tabs, excluding central electrode tabs arranged in an upright position at a central part of the electrode assembly, horizontally toward the center in the stacking direction of the electrode assembly to form an electrode tab bundle.

In the bonding sub-tabs, the sub-tabs may be arranged symmetrically around the electrode tab bundle and bonded by laser welding.

In the present disclosure, each of the sub-tabs may include: a base portion; and a support portion configured to protrude from an edge of the base portion.

In the cutting the electrode tabs, a free end of the support portion may be arranged at the same level as a free end of the electrode tab bundle.

The features and advantages of the present disclosure will become more apparent from the following detailed description based on the accompanying drawings.

Prior to this, terms or words used in this specification and claims should not be construed in their usual, dictionary meaning, and must be interpreted with meaning and concept consistent with the technical idea of the present disclosure on the basis of the principle that the inventor can define terminology appropriately to explain his or her invention in the best way possible.

According to the description of the present disclosure above, the present disclosure can ensure reliable electrical connection between an electrode tab and a sub-tab of an electrode assembly.

Particularly, according to the present disclosure, electrode tabs gathered at the center of the stacking direction of an electrode assembly and bent to protrude outward can be simply finished, and an electrode assembly can be manufactured compactly by forming a short outer extension length of an electrode tab, which can improve the energy density of a secondary battery including an electrode assembly described above.

Furthermore, the present disclosure can provide structural stability of an electrode assembly since misalignment of electrode tabs due to external force can be reduced by bend-forming an electrode tab located on the periphery to be bent horizontally.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
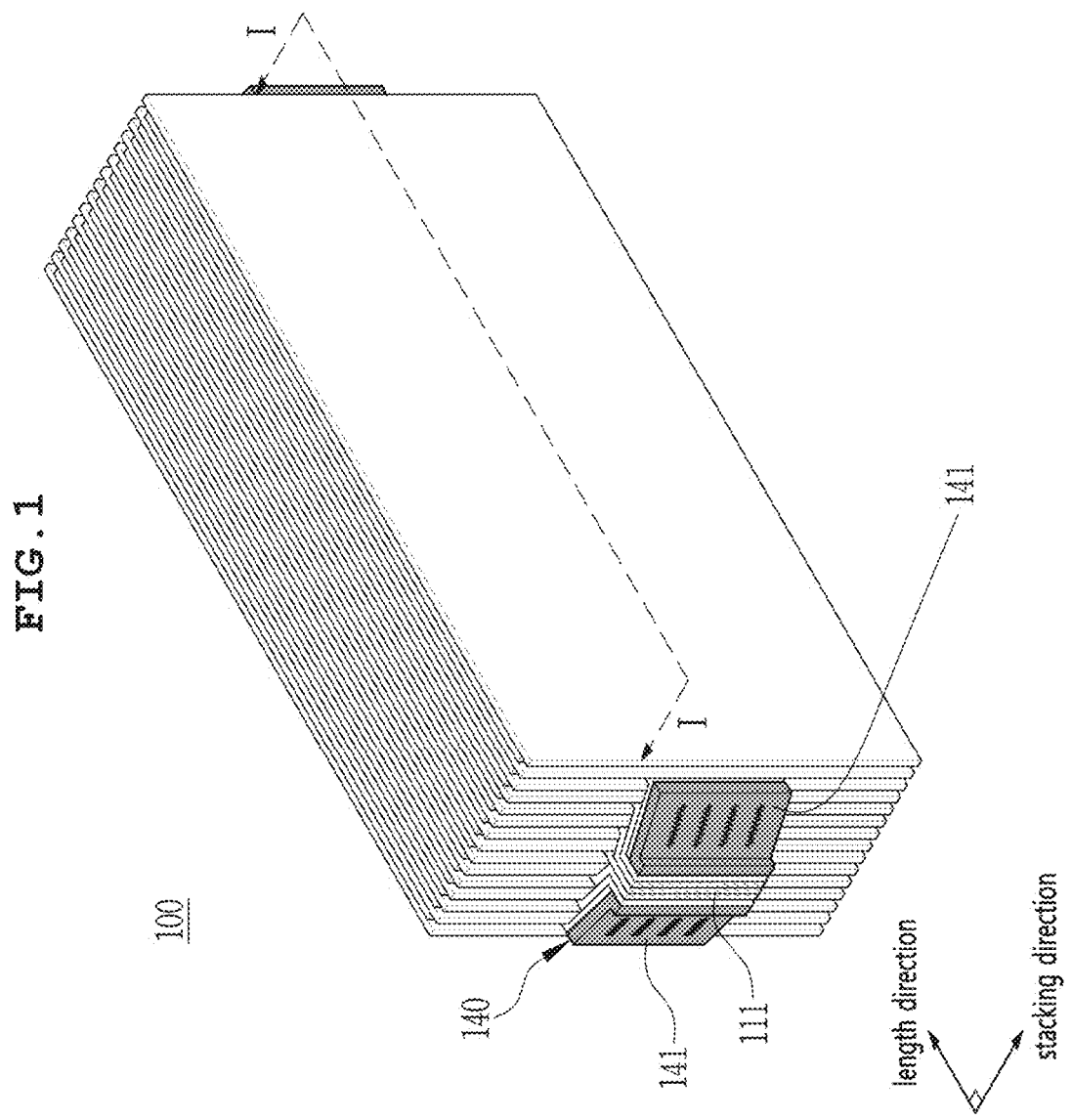
FIG. 1 is a perspective view schematically showing an electrode assembly for a secondary battery according to the present disclosure.

The objectives, advantages, and features of the present disclosure will become more apparent from the following detailed description and preferred embodiments taken in conjunction with the accompanying drawings, but the present disclosure is not necessarily limited thereto. Furthermore, in describing the present disclosure, if it is determined that a detailed description of related known technology may unnecessarily obscure the gist of the present disclosure, the detailed description will be omitted.

The embodiments described in this document and the accompanying drawings are not intended to limit the present disclosure to specific embodiments. The present disclosure should be understood to include various modifications, equivalents, and/or alternatives to the embodiments.

It should be noted that, in assigning reference numerals to components in the drawings, identical components are assigned the same reference numerals as much as possible even if they are shown in different drawings, and similar reference numbers are assigned to similar components.

In this document, terms such as first, second, etc. are used to distinguish one component from another component, and the components are not limited by the above terms. In the accompanying drawings, some components are exaggerated, omitted, or schematically shown, and the size of each component does not entirely reflect the actual size.

Electrode Assembly

The present disclosure is configured to improve the bonding structure of an electrode tab and a sub-tab by combining electrode tabs of the same polarity in an electrode assembly.

Figure 2:
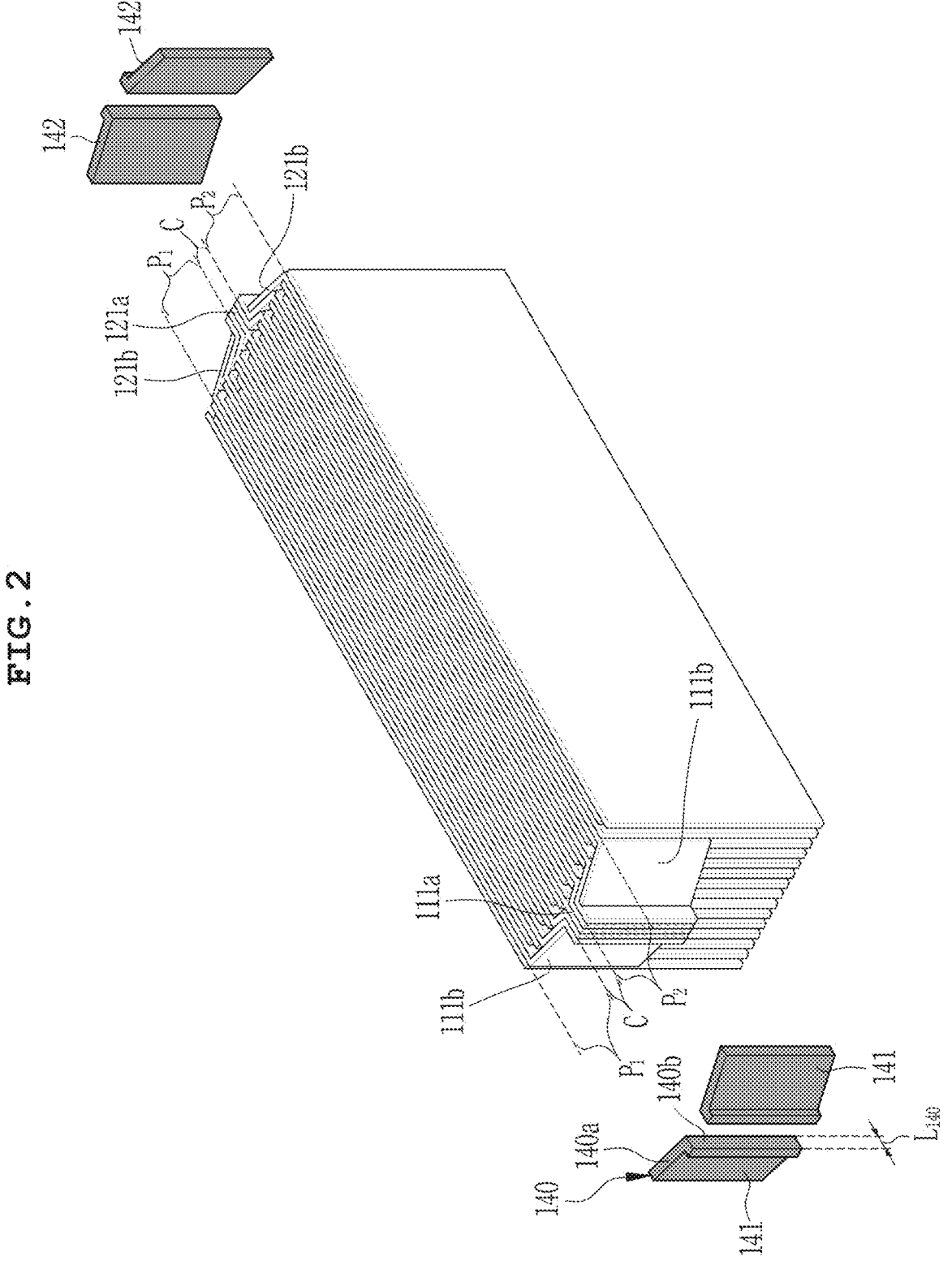
FIG. 2 is an exploded perspective view schematically showing the electrode assembly cut along line I-I of FIG. 1.
Figure 3:
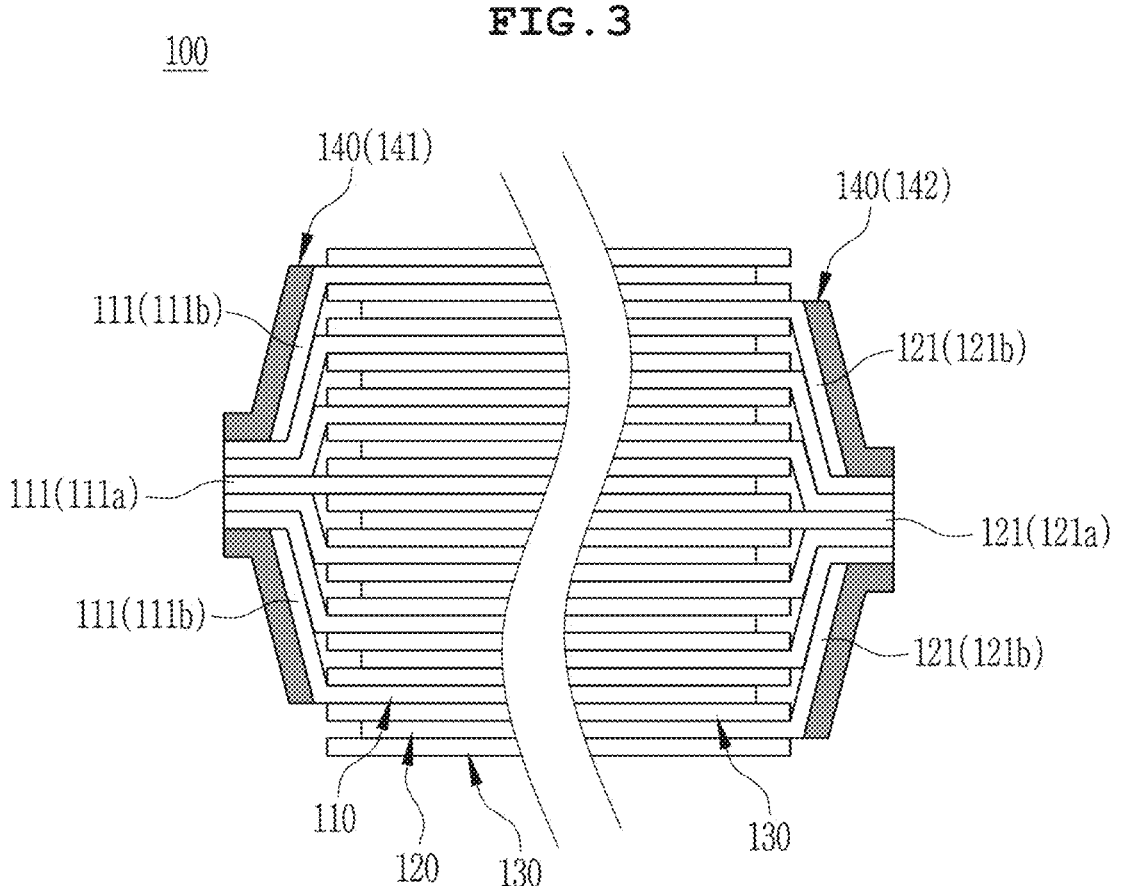
FIG. 3 is a cross-sectional view schematically showing the electrode assembly cut along line I-I of FIG. 1.

Referring to FIGS. 1 to 3, an electrode assembly 100 according to the present disclosure includes: a plurality of first electrode plates 110; a plurality of second electrode plates 120; and a separator 130 interposed between each of the first electrode plates and each of the second electrode plates. As shown, the electrode assembly 100 according to the present disclosure may be a stack-type rectangular parallelepiped-shaped electrode assembly in which a rectangular first electrode plate 110, a rectangular second electrode plate 120, and a rectangular separator 130 are arranged in a stacked manner. In this case, when the first electrode plate 110 is a positive electrode plate, the second electrode plate 120 may be a negative electrode plate. In this case, a first electrode tab, which will be described later, may be a positive electrode tab and a second electrode tab may be a negative electrode tab.

In the present disclosure, the electrode assembly may be formed in a jelly roll type by placing a first electrode plate and a second electrode plate on opposite sides of a separator and then winding the first electrode plate, the separator, and the second electrode plate.

The first electrode plate 110 includes: a first coated portion (no reference numeral) where a first electrode active material is applied to an electrically conductive first electrode current collector; and a first electrode tab 111 (or first uncoated portion) consisting of a first electrode current collector exposed due to no application of the first electrode active material. The first electrode plate (e.g., positive electrode plate) may be formed of a metal foil made with aluminum or an aluminum alloy, etc.

As shown, the first electrode tab 111 may protrude from one side of the first electrode plate 110, and may provide a current flow path between the first electrode plate and a first sub-tab, which will be described later.

Corresponding to the first electrode plate, the second electrode plate 120 includes: a second coated portion (no reference numeral) where a second electrode active material is applied to an electrically conductive second electrode current collector; and a second electrode tab 121 (or second uncoated portion) consisting of a second electrode current collector exposed due to no application of the second electrode active material. The second electrode plate (e.g., negative electrode plate) may be formed of a metal foil made with copper, copper alloy, nickel, or nickel alloy, etc.

The second electrode tab 121 may protrude from the other side of the second electrode plate 120, and may provide a current flow path between the second electrode plate and a second sub-tab, which will be described later.

At this time, the electrode tabs are arranged to extend in length in opposite directions from opposite ends of the electrode assembly 100, as shown, and consist of a plurality of first electrode tabs 111 respectively extending in length from the first electrode plates 110; and a plurality of second electrode tabs 121 respectively extending in length from the second electrode plates 120. Unlike shown, the first electrode tabs and the second electrode tabs may be arranged to extend in length parallel to each other in the same direction, while being spaced apart, from one end of the electrode assembly.

In particular, in the present disclosure, the electrode tabs 111 and 121 protruding from opposite ends of the electrode assembly 100 are bent to face each other toward the center of the stacking direction of the electrode assembly to form bundles of closely overlapping electrode tabs. This may prevent deformation/damage of the electrode tabs due to external shock, and by combining a plurality of electrode tabs arranged in parallel in an overlapping manner, a good electrical connection with sub-tabs, which will be described later, may be maintained.

In order to clearly describe the electrode tab arrangement state of the electrode assembly, in this specification, regarding the stacking direction of the electrode assembly 100, the area of the electrode assembly may be sequentially divided into a central part C and a peripheral part $P_1$ or $P_2$ from the center of the electrode assembly to the edge. In the central part C, the electrode tabs are arranged to stand vertically on opposite sides of the electrode assembly 100 whereas in the peripheral part $P_1$ or $P_2$, the electrode tabs are arranged to be bent horizontally by bend-forming. In this case, the central part C refers to the center and adjacent areas based on the stacking direction of the electrode assembly, and the peripheral part $P_1$ or $P_2$ refers to the edge area as well as near the center of the electrode assembly. In FIG. 2, although the electrode assembly is divided into the peripheral part $P_1$, the central part C, and the peripheral part $P_2$ according to the stacking direction thereof, due to the bending posture of the electrode tab, the boundary between the central part C and the peripheral part $P_1$ or $P_2$ may not be clear.

To be specific, in the present disclosure, the plurality of first electrode tabs 111 is bent and formed to be gathered together toward the central part C in the stacking direction of the electrode assembly 100 so that the plurality of first electrode tabs 111 is arranged in an overlapping manner. Correspondingly, in the present disclosure, the second electrode tabs 121, which are bent and formed to be gathered together toward the central part C in the stacking direction of the electrode assembly 100, are arranged in an overlapping manner.

The electrode tabs 111 and 121 are arranged with the same polarity in the electrode assembly 100. However, some of the electrode tabs 111 and 121 may be one or more electrode tabs 111a and 121a disposed in the central part C of the electrode assembly and maintained in an upright position, and the other electrode tabs 111 and 121 may be peripheral electrode tabs 111b and 121b disposed on the peripheral parts $P_1$ and $P_2$ of the electrode assembly and in close contact with each other in a bent state. The central electrode tabs 111a and 121a are formed to protrude in an upright position along the longitudinal (length) direction perpendicular to the stacking direction of the electrode assembly 100. The peripheral electrode tabs 111b and 121b are electrode tabs excluding the central electrode tabs 111a and 121a in an upright state, and are bent to gather toward the central electrode tabs 111a and 121a.

In the present disclosure, the electrode assembly 100 is configured such that short circuit is prevented and movement of lithium ions is allowed by interposing the separator 130, which is an insulator, between the first electrode plate 110 and the second electrode plate 120.

In addition, the electrode assembly 100 of the present disclosure may be electrically connected to each electrode terminal of a secondary battery by means of a sub-tab 140 (141 or 142). In this case, the sub-tab 140 may be divided into a first sub-tab 141 and a second sub-tab 142. The first sub-tab 141 refers to a pair of sub-tabs disposed on one side of the electrode assembly 100 and bonded to the first electrode tabs 111, and the second sub-tab 142 refers to a pair of sub-tabs disposed on the other side of the electrode assembly 100 and bonded to the second electrode tabs 121.

In the electrode assembly 100, the peripheral electrode tabs 111b and 121b in a bent state are arranged symmetrically mirrored around the central electrode tabs 111a and 121a in an upright state. In the present disclosure, the pair of sub-tabs 141 and the pair of sub-tabs 142 are respectively placed on opposite sides of the electrode tabs 111 and 121 that are gathered at the center of the stacking direction of the electrode assembly and protrude outward. In other words, the pair of sub-tabs 141 and the pair of sub-tabs 142 may be respectively connected to the peripheral parts $P_1$ and $P_2$ including the peripheral electrode tabs 111b and 121b in a bent state to enable electrical communication. The bending structure of the electrode tabs described above not only provides opportunities for contact between each electrode tab and the sub-tab, but also reduces contact resistance by increasing the contact area between the electrode tab and the sub-tab. In addition, due to this structure, the present disclosure may improve the durability of a secondary battery by reducing temperature deviation along the stacking direction of an electrode assembly due to heat generated during high-output discharge.

As shown, the sub-tabs 141 and 142 may be formed in an overall L-shaped cross-sectional shape corresponding to the arrangement shape of the central electrode tabs 111a and 121a and the peripheral electrode tabs 111b and 121b.

The sub-tabs 141 and 142 include a base portion 140a and a support portion 140b that protrudes outward from the edge of the base portion 140a. Preferably, the support portion may extend from the edge of the base portion at an angle, for example a right angle. While the base portion 140a is in face-to-face contact with the peripheral electrode tabs 111b and 121b in a bent state, the support portion 140b is in face-to-face contact with the side of the electrode tab bundle, where the electrode tabs 111 and 121 are gathered at the center of the stacking direction of the electrode assembly and protrude outward. Thus, in the present disclosure, by supporting and holding the side of each electrode tab bundle with the support portion 140b of the sub-tabs 141 and 142, deformation such as unnecessary distortion of the electrode tabs due to external force may be prevented.

In the present disclosure, the pairs of sub-tabs 141 and 142 may be bonded to the electrode tabs 111 and 121 using a welding method, preferably laser welding. As known to those skilled in the field, laser welding has the advantage of reducing heat damage to parts due to its high energy density and improving welding strength between electrode tabs and sub-tabs by providing precise and high-quality welds.

Optionally, the free end of the support portion 140*b* and the free end of the electrode tab bundle are arranged flatly at the same level so that the support portion 140*b* may sufficiently support and hold the electrode tab bundle, for example, the central electrode tabs 111*a* and 121*a* in an upright state without exposing the electrode tabs to the external environment as much as possible.

Figure 4:
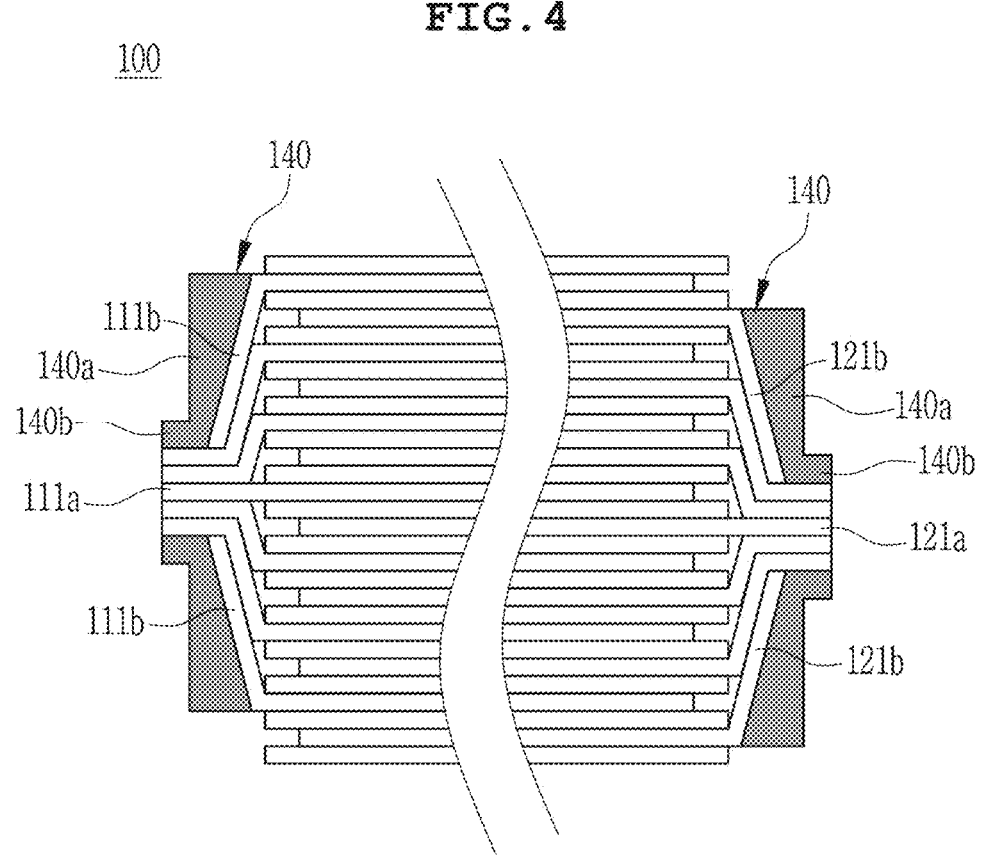
FIG. 4 is a cross-sectional view schematically showing another example of an electrode assembly for a secondary battery according to the present disclosure.

FIG. 4 is a cross-sectional view schematically showing an electrode assembly to which another example of a sub-tab is applied, and shows a sub-tab 140 that may ensure a reliable contact state with the peripheral electrode tabs 111*b* and 121*b* in a bent state.

As shown, the peripheral electrode tabs 111*b* and 121*b* are bent in a horizontal direction toward the central part C with respect to the stacking direction of the electrode assembly and are overlapped and inclined downward from the center to the edge. Accordingly, in the present disclosure, the base portion 140*a* of the sub-tab 140 to be disposed opposite the peripheral electrode tabs 111*b* and 121*b* is tapered toward the support portion to securely adhere to the outside of the peripheral electrode tabs 111*b* and 121*b*. That is, the base portion 140*a* of the sub-tab gradually becomes thicker from the center to the edge of the electrode assembly, forming an inclined opposing surface facing the peripheral electrode tabs 111*b* and 121*b* in a bent state.

This, in turn, may provide a reliable contact state between the peripheral electrode tabs in a bent state and the sub-tab.

Manufacturing Method of Electrode Assembly

As previously described, in the present disclosure, the electrode tabs and the sub-tabs are electrically connected by welding the sub-tabs on the opposite sides, for example, on the peripheral parts $P_1$ and $P_2$, of the electrode tabs that am gathered at the center of the stacking direction of the electrode assembly and protrude outward. The following is a description of a manufacturing method for contact-fixing the bend-formed electrode tabs and the sub-tabs so as to be electrically connected using laser welding.

As shown in FIGS. 5A to 5D, a manufacturing method of an electrode assembly according to the present disclosure includes preparing an electrode assembly (S100), bend-forming electrode tabs (S200), bonding sub-tabs (S300), and cutting electrode tabs (S400).

Figure 5A:
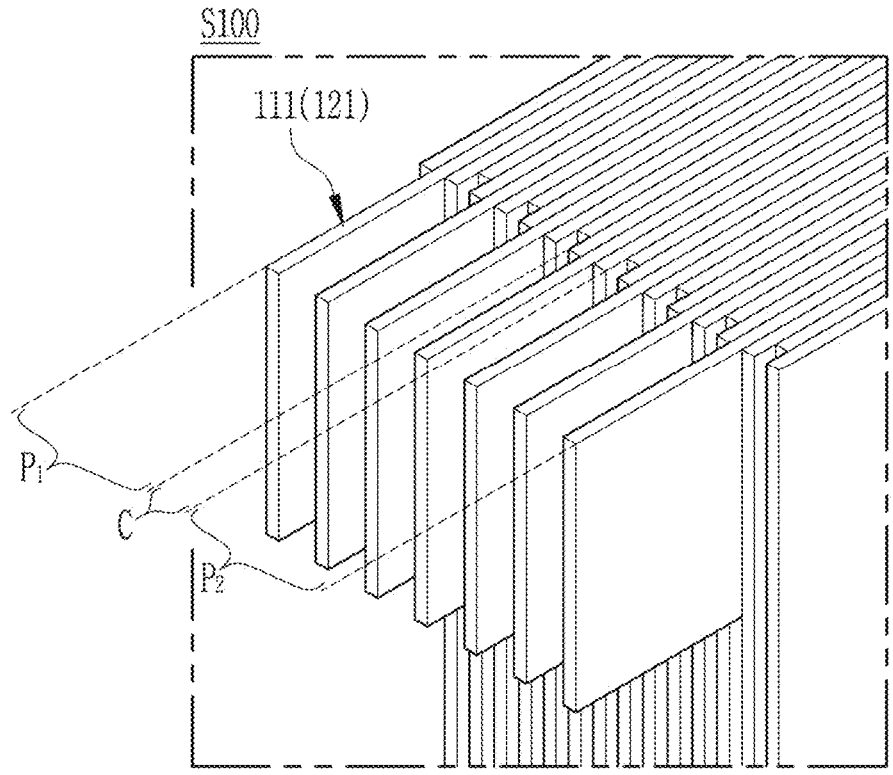
FIGS. 5A to 5D are schematic diagrams showing step by step a manufacturing method of an electrode assembly for a secondary battery according to the present disclosure.

First, in the step S100, an electrode assembly 100 having electrode tabs 111 and 121 protruding outward from opposite ends of the electrode assembly 100 is prepared (see FIG. 5A).

The first electrode tabs 111 are configured with the same polarity on one side of the electrode assembly 100, and are arranged in parallel and spaced apart from each other at predetermined intervals along the stacking direction of the electrode assembly throughout the peripheral part $P_1$, the central part C, and the peripheral part $P_2$. Correspondingly, the second electrode tabs 121 are configured with the same polarity on the other side of the electrode assembly 100, and are arranged in parallel and spaced apart from each other at predetermined intervals along the stacking direction of the electrode assembly throughout the peripheral part $P_1$, the central part C, and the peripheral part $P_2$.

In this case, the electrode tabs 111 and 121 are divided into central electrode tabs 111*a* and 121*a* located at the central part C and peripheral electrode tabs 111*b* and 121*b* located at the peripheral parts $P_1$ and $P_2$ according to the stacking direction of the electrode assembly.

Figure 5B:
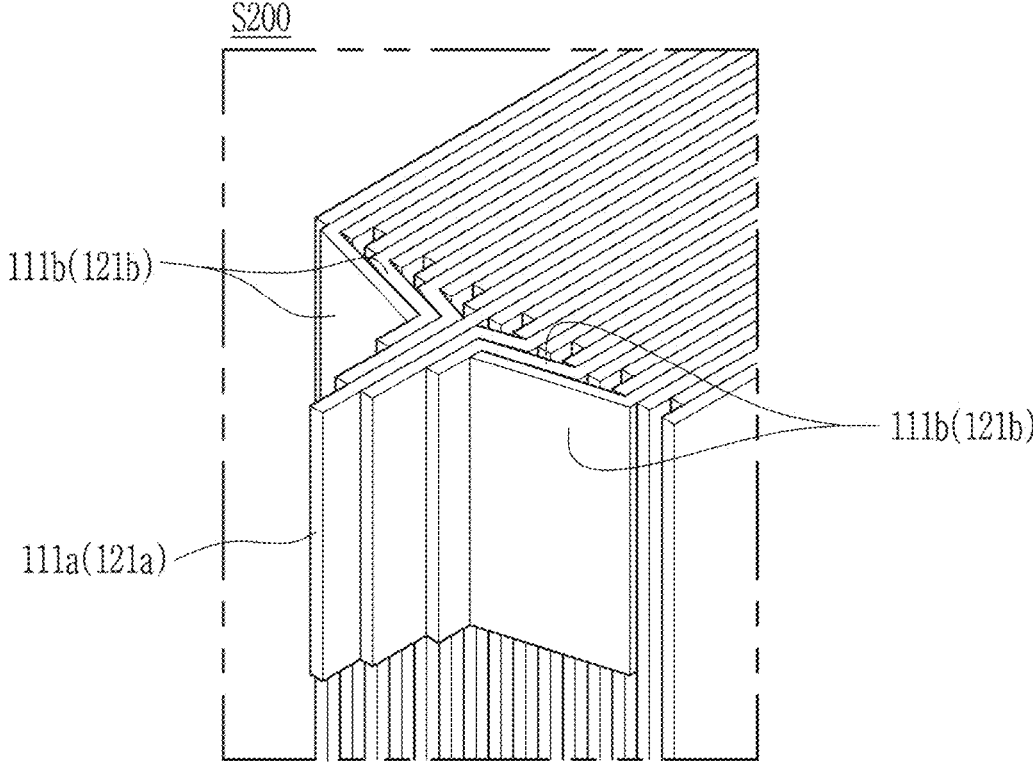

As described above, the present disclosure may include the step S200 of bend-forming the electrode tabs 111 and 121 so as to be gathered toward the center of the stacking direction of the electrode assembly 100, for example, the central part C. Referring to FIG. 5B, in the present disclosure, the peripheral electrode tabs 111*b* and 121*b* are bent and formed so that the peripheral electrode tabs 111*b* and 121*b* are horizontally bent toward the central part C through step S200. In contrast, the central electrode tabs 111*a* and 121*a* are not directly affected by bend-forming and may maintain an upright position along the longitudinal direction of the electrode assembly 100.

As shown, the peripheral electrode tabs 111*b* and 121*b* are bent in the horizontal direction toward the central electrode tabs 111*a* and 121*a* at the central part C of the electrode assembly 100 and are aligned to overlap each other to form a bundle of electrode tabs (no reference numeral). As a result, the contact area with the sub-tabs 141 and 142 may be increased while the electrode assembly 100 may be manufactured compactly.

In addition, in the present disclosure, a press process may be additionally performed to bring the central electrode tabs 111*a* and 121*a*, which maintain the upright position, into close contact with each other.

In the present disclosure, individual peripheral electrode tabs 111*b* and 121*b* of the same polarity may be electrically connected by the sub-tabs in an overlapping state.

Figures 5C, 5D:
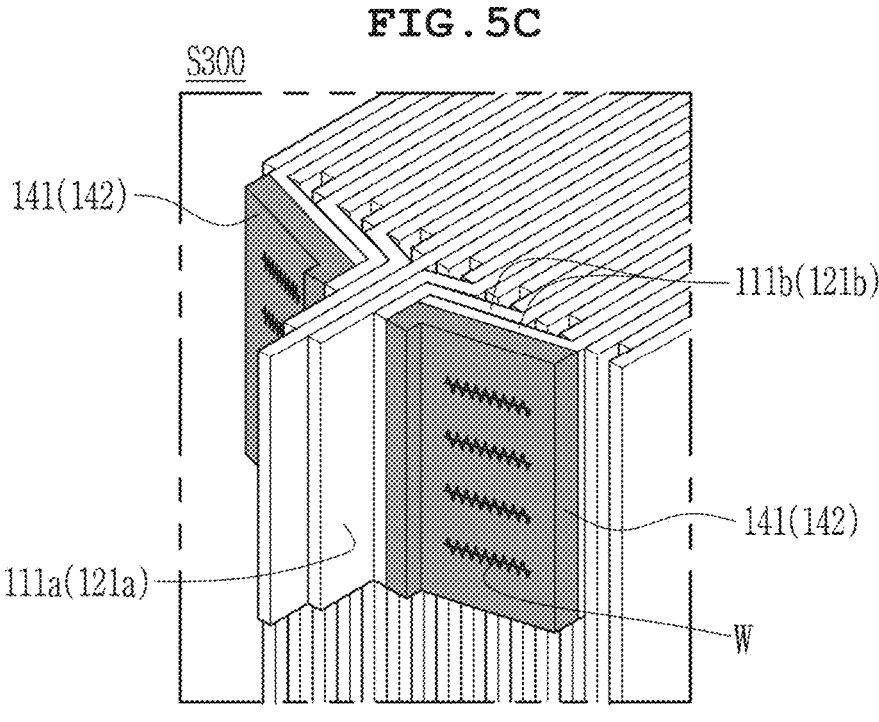

As shown in FIG. 5C, the present disclosure may include the step S300 of bonding the sub-tabs 141 and 142. To be specific, in the present disclosure, the peripheral electrode tabs 111*b* and 121*b* in a bent state and the sub-tabs 141 and 142 may be bonded to each other by laser welding.

In the bonding step S300, the sub-tabs 141 and 142 having an L-shaped cross-sectional shape are positioned on the peripheral electrode tabs 111*b* and 121*b* in a bent state, respectively, arranged mirror-symmetrically around the central electrode tabs 111*a* and 121*a* in an upright state. Then, the pairs of sub-tabs 141 and 142 may be fixed in position to enable electrical communication through welding W with the peripheral electrode tabs 111*b* and 121*a* that overlap in a bent state within the peripheral parts $P_1$ and $P_2$.

In addition, welding defects may be prevented as the welding process with the sub-tabs progresses in the area where the peripheral electrode tabs 111*b* and 121*b* overlap in a bent state.

Optionally, the central electrode tabs 111*a* and 121*a* in an upright state disposed between the support portions 140*b* (see FIG. 2) of the pairs of sub-tabs 141 and 142 arranged in mirror symmetry, specifically the electrode tab bundle, may be fixed in position by laser welding.

Referring to FIG. 5D, the joint portion of the electrode tabs and the sub-tabs of the electrode assembly may be finished in the step S400.

The electrode tab bundle including the central electrode tabs 111*a* and 121*a* in an upright state may protrude outward between the support portions 140*b* of the pairs of sub-tabs 141 and 142, as shown in FIG. 5C. Accordingly, the present disclosure includes the cutting step S400 of the electrode tabs in which the ends of the bundle of electrode tabs extending outward between the support portions 140*b* are cut to the same level as the support portions. In other words, the ends of the central electrode tabs 111*a* and 121*a* constituting the electrode tab bundle may be cut to the same level as the support portion. Optionally, the ends of some of the peripheral electrode tabs 111*b* and 121*b* constituting the electrode tab bundle may also be cut to the same level as the support portion.

The ends of the central electrode tabs or the bundle of electrode tabs may be removed with a knife or cutter, or cut using a laser, heat wire, etc. In addition, in the present disclosure, in order to improve the cutting quality at the end of the electrode tab bundle, a laser beam is emitted to the cutting area at the end to enable smooth cutting.

To sum up, the present disclosure makes it possible to compactly manufacture an electrode assembly by forming a bundle of electrode tabs, specifically, the outer extension length of the electrode tabs, through the bend-forming (S300) and the cutting (S400) described above. Furthermore, by forming electrode tabs of the same polarity into an electrode tab bundle and supporting the bundle with sub-tabs, the strength of the electrode tabs may be enhanced to prevent deformation (twisting, bending, etc.) of the electrode tabs, and an opportunity for reliable contact between the electrode tabs and the sub-tabs may be provided.

In the present disclosure, the bonding (S300) of the sub-tabs and the cutting (S400) of the electrode tabs may be performed in any order. As described, the cutting (S400) may be performed after the bonding (S300), and vice versa.

In conclusion, the present disclosure may provide the electrode assembly 100 with an improved bonding structure between the electrode tabs 111 and 121 and the sub-tabs 141 and 142.

Secondary Battery

A secondary battery according to the present disclosure is characterized by incorporating the electrode assembly 100 described above. The secondary battery includes: the electrode assembly 100; a casing 200 containing the electrode assembly 100; a cap plate 210 sealing an opening of the casing 200; electrode terminals 221 and 222 installed on the cap plate; and lead tabs 231 and 232 that electrically connect the electrode assembly 100 and the electrode terminals 221 and 222.

Figure 6:
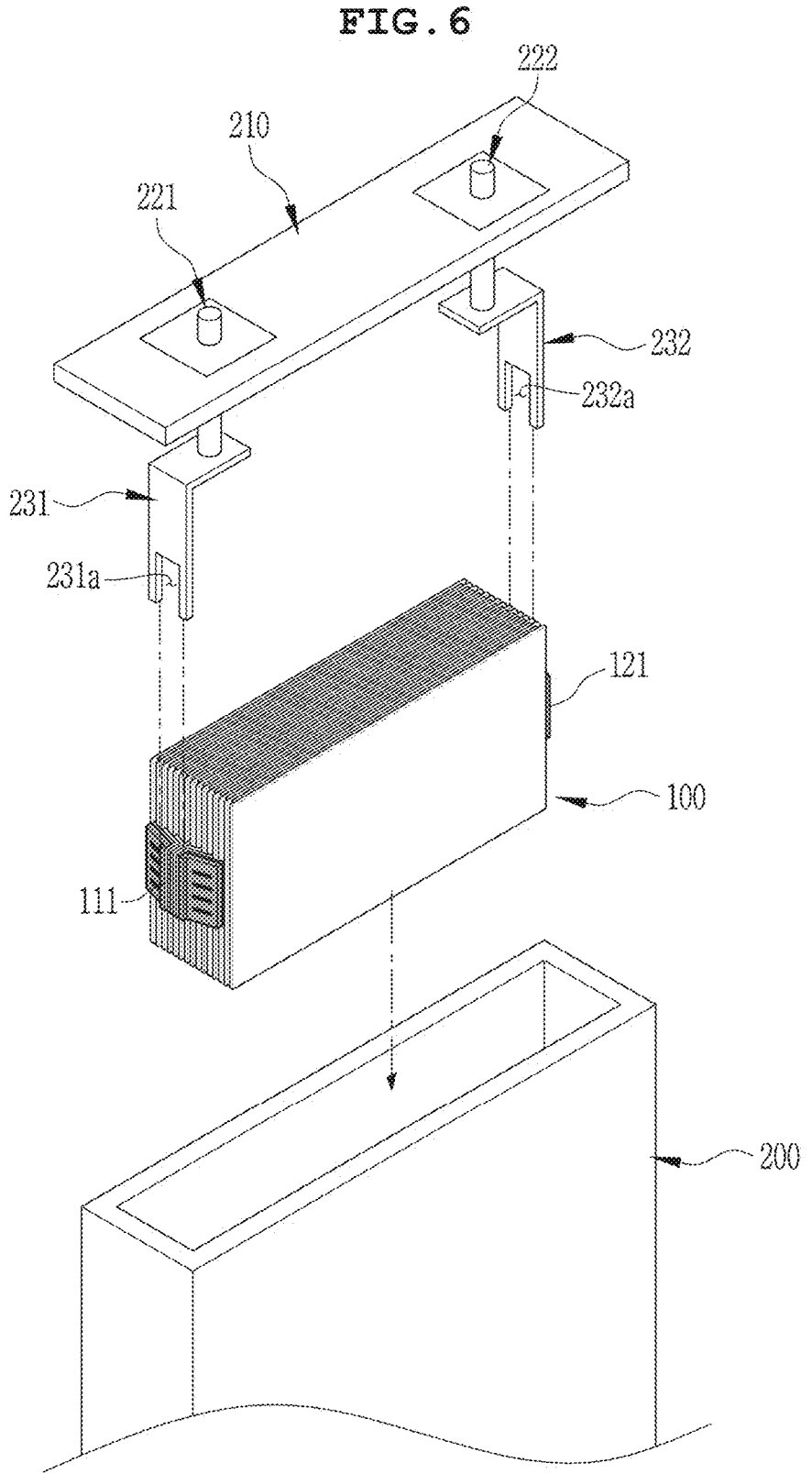
FIG. 6 is an exploded perspective view schematically showing an example of a secondary battery employing the electrode assembly according to the present disclosure.

As shown in FIG. 6, the secondary battery according to the present disclosure illustrates a prismatic secondary battery as an example, but is not limited thereto and may also be applied to various types of secondary batteries.

The electrode assembly 100 includes the first electrode plate 110 with the first electrode tab 111, the second electrode plate 120 with the second electrode tab 121, and the separator 130 interposed between the first electrode plate 110 and the second electrode plate 120. The electrode assembly 100 may be formed in a rectangular parallelepiped shape. Preferably, the electrode assembly 100 is characterized by bonding a pair of sub-tabs 140 to opposite sides of the electrode tabs 111 and 121 that are gathered at the center of the stacking direction of the electrode assembly 100 and protrude outward.

Meanwhile, the electrode assembly 100 has the same configuration as the electrode assembly 100 shown in FIGS. 1 to 4, and redundant description will be omitted from the corresponding description below.

As shown, in the secondary battery according to the present disclosure, the electrode assembly 100 is inserted into the casing through the opening of the casing 200 and is stored in the casing 200 together with an electrolyte.

As is widely known to those skilled in the art, the casing 200 may be made of a conductive metal material such as aluminum, aluminum alloy, or nickel-plated steel, and may be formed in, for example, a rectangular parallelepiped shape corresponding to the shape of the electrode assembly. As shown, the casing 200 may have a can shape with the top (or one side) open.

In addition, the inner surface of the casing 200 may be insulated from the electrode tabs 111 and 121 of the electrode assembly 100 by placing an insulating member or insulating in some other way.

The cap plate 210 seals the upper opening of the casing 200 to prevent moisture from penetrating into the secondary battery and to prevent the electrolyte contained inside the secondary battery from leaking out. In addition, the cap plate 210 may be made of the same material as the casing 200 and may be coupled to the casing 200 by laser welding or the like.

In the present disclosure, the cap plate 210 may be provided with an electrolyte injection port that helps inject the electrolyte and a vent hole to discharge internal pressure caused by gas generated inside the secondary battery, but since this is a known technology, detailed descriptions and drawings thereof will be omitted in this specification.

The electrode terminals 221 and 222 are coupled through two terminal holes provided in the cap plate 210, and may be electrically connected to the first electrode tab 111 and the second electrode tab 121 of the electrode assembly 100 installed inside the casing 200 through the respective lead tabs 231 and 232.

As shown, the outer ends of the electrode terminals 221 and 222 are disposed to protrude to the outside of the cap plate 210, while the inner ends of the electrode terminals 221 and 222 are connected to the lead tabs 231 and 232 extending in length toward the electrode tabs 111 and 121 located at opposite ends of the electrode assembly 100. Thus, an example of the secondary battery according to the present disclosure is configured so that the electrode terminals 221 and 222 may extend parallel to each other in the same direction while being spaced apart within the cap plate that seals the upper opening of the casing.

The lead tabs 231 and 232 are formed in a bar shape to electrically connect the electrode tabs 111 and 121 at the inner ends of the electrode terminals 221 and 222, and may be electrically connected to each electrode tab. In other words, the lead tabs perform the role of collecting current generated from the first and second electrode plates of the electrode assembly and guiding the collected current to each electrode terminal.

The secondary battery according to the present disclosure improves the current collection performance between the lead tabs 231 and 232 and the electrode tabs 111 and 121 of the electrode assembly 100. To be specific, the contact area between the electrode tabs and the lead tabs of the electrode assembly is increased, and not only does welding between the electrode tabs and the sub-tabs become easier but a reliable bonding state may be expected.

Optionally, the lead tabs 231 and 232 may form receiving grooves 231a and 232a to accommodate each electrode tab. The receiving grooves 231a and 232a may be formed in an elongated concave shape at the bottom of the lead tab to fit the support portion 140b of the sub-tab 140 together with the electrode tab bundle. Accordingly, the present disclosure may combine the lead tabs and the sub-tabs to enable electrical communication.

The lead tabs 231 and 232 may be bonded to the electrode tabs 111 and 121 of the electrode assembly 100 through the sub-tabs 140 and 141 and 142, respectively, and may be respectively bonded to the sub-tabs 141 and 142 through welding. The lead tabs 231 and 232 may also be bonded by using a conductive adhesive. For reference, the sub-tab 140 (see FIG. 2) is composed of a first sub-tab 141 bonded to correspond to the first electrode tab and a second sub-tab 142 bonded to correspond to the second electrode tab.

As is widely known to those skilled in the art, the first electrode tab 111, the first sub-tab 141, and the first lead tab 231 may be made of the same material. For example, when the first electrode tab 111 is aluminum-based, the first sub-tab 141 and the first lead tab 231 may also be aluminum-based.

Correspondingly, the second electrode tab 121, the second sub-tab 142, and the second lead tab 232 may be made of the same material. When the second electrode tab 121 is copper-based, the second sub-tab 142 and the second lead tab 232 may also be copper-based.

Figure 7:
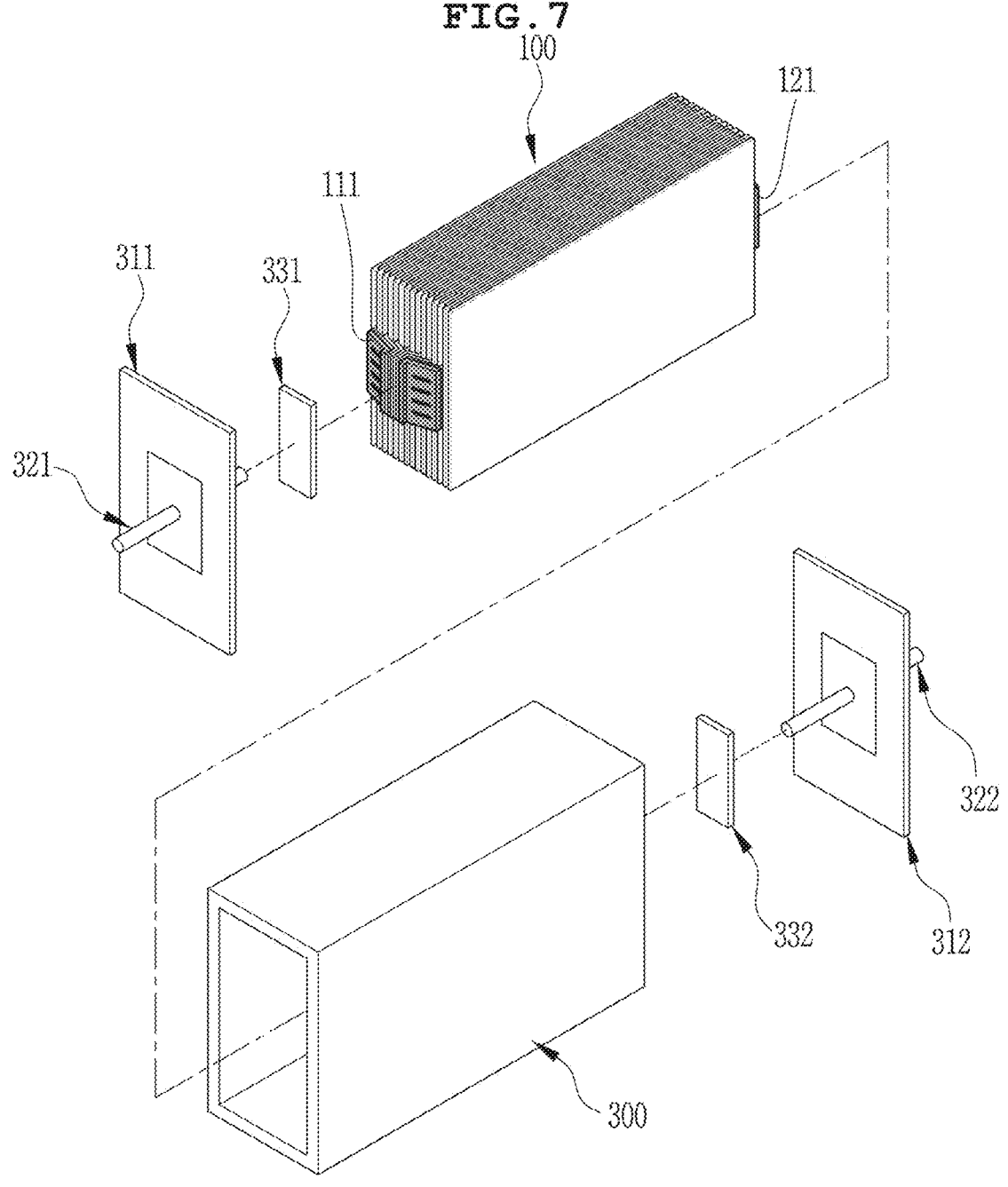
FIG. 7 is an exploded perspective view schematically showing another example of a secondary battery employing the electrode assembly according to the present disclosure.

FIG. 7 is an exploded perspective view schematically showing another example of a secondary battery employing the electrode assembly 100 according to the present disclosure. The secondary battery shown in FIG. 7 is a modified version of the secondary battery shown in FIG. 6. Since the secondary battery shown in FIG. 7 has a very similar structure except for the arrangement structure of the electrode terminals, description of similar or identical structures will be excluded to facilitate a clear understanding of the present disclosure.

Another example of the secondary battery according to the present disclosure is configured such that electrode terminals protrude in opposite directions from opposite sides of the casing.

Another example of the secondary battery according to the present disclosure is characterized by incorporating the electrode assembly 100 described above. The secondary battery includes: the electrode assembly 100; a casing 300 containing the electrode assembly 100; cap plates 311 and 312 sealing an opening on opposite sides of the casing 300; electrode terminals 321 and 322 installed respectively on the cap plates; and lead tabs 331 and 332 that electrically connect the electrode assembly 100 and the electrode terminals 321 and 322.

As shown, the casing 300 is formed in the shape of a hollow tube with both sides open facing each other in the longitudinal direction, and may be formed into, for example, a hollow rectangular cross-sectional shape corresponding to the shape of the electrode assembly.

In addition, the inner surface of the casing 300 may be insulated from the electrode tabs 111 and 121 of the electrode assembly 100 by placing an insulating member or insulating in some other way.

A pair of cap plates 311 and 312 is disposed at each opening on opposite sides of the casing 300 to seal the openings to prevent moisture from penetrating into the secondary battery and to prevent an electrolyte contained within the secondary battery from leaking out.

For example, a first electrode terminals 321 is coupled through a terminal hole provided in a first cap plate 311 that seals one opening of the casing 300, and may be electrically connected to the first electrode tab 111 of the electrode assembly 100 installed inside the casing 300 through a first lead tab 331.

Correspondingly, a second electrode terminal 322 is coupled through a terminal hole provided in a second cap plate 312 that seals the other opening of the casing 300, and may be electrically connected to the second electrode tab 121 of the electrode assembly 100 installed inside the casing 300 through a second lead tab 332.

As shown, the outer ends of the first and second electrode terminals 321 and 322 are disposed to protrude outward from each cap plate 311 and 312, while the inner ends of the first and second electrode terminals 321 and 322 are electrically connected to the electrode tabs 111 and 121 located at opposite ends of the electrode assembly 100 and are connected to the first and second lead tabs 331 and 332, respectively.

The first lead tab 331 may be formed in a shape that allows the inner end of the first electrode terminal 321 and the first electrode tab 111 to be electrically connected to each other. Correspondingly, the second lead tab 332 may be formed in a shape that allows the inner end of the second electrode terminal 322 and the second electrode tab 121 to be electrically connected to each other. Preferably, the lead tabs 331 and 332 are formed in a plate shape, as shown, to minimize the space occupation required for bonding to the electrode tabs within the casing. Furthermore, the plate-shaped lead tabs may provide a reliable contact state with the free ends of the electrode tabs 111 and 121.

Above, the present disclosure has been described in detail through specific embodiments. The embodiments are for specifically explaining the present disclosure, and the present disclosure is not limited thereto. It should be clear that modifications and improvements can be made by those skilled in the art within the technical spirit of the present disclosure.

All simple modifications or changes of the present disclosure fall within the scope of the present disclosure, and the specific scope of protection of the present disclosure will be made clear by the appended claims.

What is claimed is:

1. An electrode assembly, comprising:
a plurality of first electrode plates including electrode tabs;
a plurality of second electrode plates including electrode tabs; and
a separator interposed between each of the first electrode plates and each of the second electrode plates,
wherein the each of the first electrode plates and the each of the second electrode plates, and the separator are arranged in a stacked manner, and
electrode tabs of the same polarity are gathered at a center of a stacking direction of the electrode assembly to form an electrode tab bundle that protrudes outward, and a pair of sub-tabs are symmetrically arranged around the electrode tab bundle and are respectively bonded to opposite sides of the electrode tab bundle,
wherein each of the sub-tabs comprises:
a base portion tapered to correspond to a bending structure of the electrode tab bundle; and
a support portion configured to protrude from an edge of the base portion.

2. The electrode assembly of claim 1, wherein the electrode tab bundle comprises:
a central electrode tab arranged in an upright position at a central part of the electrode assembly; and
a peripheral electrode tab arranged in a bent state at a peripheral part of the electrode assembly.

3. The electrode assembly of claim 2, wherein the peripheral electrode tab is bent horizontally toward the central part with respect to the stacking direction of the electrode assembly.

4. The electrode assembly of claim 1, wherein the sub-tab is bonded to each side of the electrode tab bundle by laser welding.

5. The electrode assembly of claim 1, wherein a free end of the support portion is arranged at the same level as a free end of the electrode tab bundle.

6. The electrode assembly of claim 1, wherein the electrode tab bundle is arranged to extend lengthwise in opposite directions from each end of the electrode assembly.

7. A secondary battery, comprising:
the electrode assembly according to claim 1;

a casing configured to accommodate the electrode assembly and have one side open; and a cap plate configured to seal an opening on the one side of the casing, wherein in the cap plate, a first electrode terminal and a second electrode terminal connected to the electrode assembly are arranged in the same direction.

8. A secondary battery, comprising:

the electrode assembly according to claim 1;

a casing configured to accommodate the electrode assembly and have opposing sides open; and first and second cap plates respectively sealing openings on the opposing sides of the casing, wherein in the first cap plate, a first electrode terminal connected to the electrode assembly is disposed, and in the second cap plate, a second electrode terminal connected to the electrode assembly is disposed in an opposite direction to the first electrode terminal.

\* \* \* \* \*